US008837534B2

(12) United States Patent
Lancaster et al.

(10) Patent No.: US 8,837,534 B2
(45) Date of Patent: Sep. 16, 2014

(54) ELEMENT FOR THE AMPLIFICATION OF A LIGHT AND METHOD OF MAKING THE SAME

(71) Applicants: Adelaide Research & Innovation Pty Ltd, Adelaide (AU); Macquarie University, North Ryde (AU)

(72) Inventors: David Lancaster, Valley View (AU); Simon Gross, Greenwich (AU); Tanya Marie Monro, Urrbrae (AU); Michael Withford, Ingleside (AU); Alexander Fuerbach, Duffys Forest (AU)

(73) Assignees: Adelaide Research & Innovation Pty Ltd., Adelaide (AU); Macquarie University, North Ryde (AU)

( * ) Notice: Subject to any disclaimer, the term of this patent is extended or adjusted under 35 U.S.C. 154(b) by 0 days.

(21) Appl. No.: 13/908,442

(22) Filed: Jun. 3, 2013

(65) Prior Publication Data
US 2013/0343416 A1 Dec. 26, 2013

Related U.S. Application Data

(63) Continuation of application No. PCT/AU2011/001563, filed on Dec. 2, 2011.

(30) Foreign Application Priority Data

Dec. 3, 2010 (AU) .................. 2010905322
Dec. 8, 2010 (AU) .................. 2010905408

(51) Int. Cl.
H01S 3/30 (2006.01)
H01S 3/06 (2006.01)
(Continued)

(52) U.S. Cl.
CPC .............. *H01S 3/0602* (2013.01); *H01S 3/173* (2013.01); *H01S 3/1616* (2013.01); *H01S 3/094038* (2013.01); *H01S 3/09415* (2013.01); *C03C 3/325* (2013.01); *G02B 6/13* (2013.01); *H01S 3/0064* (2013.01); *H01S 3/063* (2013.01); *G02B 6/30* (2013.01); *C03C 4/0071* (2013.01); *G02B 6/122* (2013.01); *G02B 6/124* (2013.01)
USPC ............................................ 372/6; 372/40

(58) Field of Classification Search
USPC .................................................. 372/6, 40
See application file for complete search history.

(56) References Cited

U.S. PATENT DOCUMENTS 3,599,106 A * 8/1971 Snitzer .................... 359/337
4,044,315 A * 8/1977 Snitzer .................... 372/40
(Continued)

FOREIGN PATENT DOCUMENTS

WO WO2008025076 3/2008

OTHER PUBLICATIONS

International Search Report for International Application No. PCT/AU2011/001563, mailed Jan. 30, 2012.

(Continued)

*Primary Examiner* — Kinam Park
(74) *Attorney, Agent, or Firm* — Fish & Richardson P.C.

(57) ABSTRACT

An element for the amplification of a light by stimulated emission of radiation and a method of making the same is described herein.

26 Claims, 20 Drawing Sheets

(51) Int. Cl.
- *C03C 3/32* (2006.01)
- *G02B 6/13* (2006.01)
- *H01S 3/063* (2006.01)
- *C03C 4/00* (2006.01)
- *G02B 6/122* (2006.01)
- *G02B 6/124* (2006.01)
- *H01S 3/17* (2006.01)
- *H01S 3/16* (2006.01)
- *H01S 3/094* (2006.01)
- *H01S 3/0941* (2006.01)
- *H01S 3/00* (2006.01)
- *G02B 6/30* (2006.01)

(56) References Cited

U.S. PATENT DOCUMENTS

| | | | |
|---|---|---|---|
| 5,541,947 A * | 7/1996 | Mourou et al. | 372/25 |
| 7,298,547 B1 * | 11/2007 | Jiang et al. | 359/341.1 |
| 2003/0035640 A1 | 2/2003 | Dugan et al. | |

OTHER PUBLICATIONS

International Preliminary Report on Patentability for International Application No. PCT/AU2011/001563, mailed Mar. 26, 2013.

\* cited by examiner

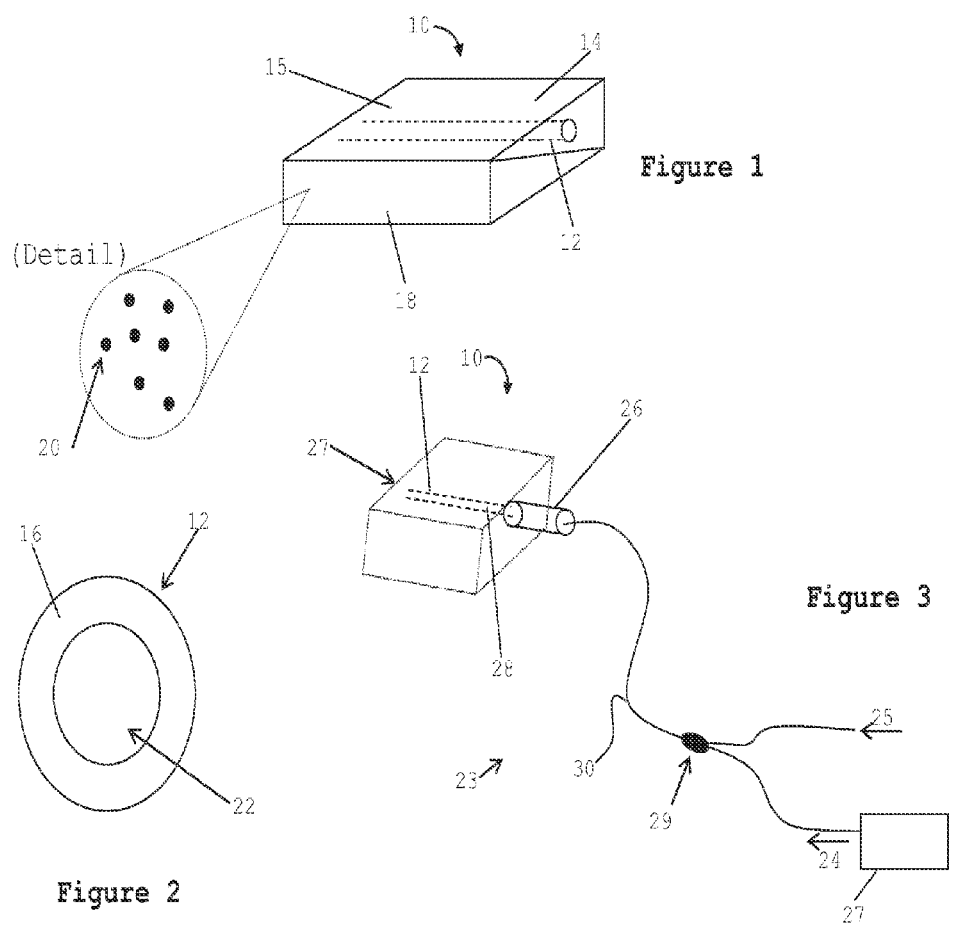

ELEMENT FOR THE AMPLIFICATION OF A LIGHT AND METHOD OF MAKING THE SAME

CROSS-REFERENCE TO RELATED APPLICATIONS

The present application is a continuation of International Application No. PCT/AU2011/001563, filed Dec. 2, 2011, which claims priority from Australian Application No. 2010905322, filed Dec. 3, 2010, and Australian Application No. 2010905408, filed Dec. 8, 2010. The entire contents of the prior applications are incorporated herein by reference in their entirety.

FIELD OF THE INVENTION

The present invention generally relates to an element for the amplification of a light by stimulated emission of radiation and a method of making the same, and particularly but not exclusively to a laser amplifier having the element, and a laser oscillator having the element.

BACKGROUND OF THE INVENTION

Low maintenance, low cost and spectrally selective sources of coherent light of short to mid-infrared wavelengths have potential applications including trace gas spectroscopy, process control, environmental safety monitoring, real-time breath analysis, telecommunications and the testing of infrared countermeasure systems. Regrettably, practical sources having these characteristics are generally not available. The commercially available solid state lasers at these wavelengths generally use non-linear wavelength conversion because there are few practical laser materials that provide these wavelengths. Wavelength conversion is generally inefficient, complex and expensive. The commercially available quantum cascade diode lasers that may generate these wavelengths are generally prohibitively expensive, require generally inconvenient evacuated enclosures, and have inferior spectral and spatial mode quality.

SUMMARY OF THE INVENTION

According to a first aspect of the invention, there is provided an element for the amplification of light by stimulated emission of radiation, the element comprising:

a piece of glass comprising a tubular structure that is positioned within the piece of glass and along which the light in use is guided, the tubular structure having a boundary region that has an average refractive index that is less than that of a majority of the piece of glass and less than that of an interior of the boundary region, the boundary region comprising at least one filament, the piece of glass further comprising a plurality of centres located within the piece of glass and that amplify the light when so guided, the amplification being by stimulated emission of radiation when the centres are illuminated by a suitable other light.

The Applicants have demonstrated, for example, surprisingly efficient short-infrared lasers incorporating such elements.

The interior may be more than 1 micrometer across. The interior may be less than 40 micrometers across. The interior may be between 20 and 30 micrometers across. Generally any suitable interior dimension may be used.

In an embodiment, the interior of the tubular structure has substantially the same optical properties as the majority of the piece of glass.

In some embodiments, the light is guided predominantly within the interior of the tube which may not have been significantly degraded by the process used to form the respective structures. Thus, light propagating within the structures of these embodiments may experience lower loss than light propagating in some prior art waveguides. This may improve the performance of these embodiments.

In an embodiment, the boundary region is greater than 10 micrometers thick. The boundary region may be less than 40 micrometers thick. The boundary region may be between 20 and 30 micrometers thick. The boundary region may be around 25 micrometers thick. The boundary region may be around 23 micrometers thick. The boundary region may be around 32 micrometers thick. Generally, however, any suitable boundary region thickness may be used.

In an embodiment, the boundary region comprises at least one filament, each of the at least one filament having a refractive index less than that of the majority of the piece of glass. The at least one filament may extend along the structure.

In an embodiment, the at least one filament is linear. More than one filament may be a line and/or linear.

In an embodiment, at least one filament is helical. The helical filament may extend along the structure. One of the at least one helical filament may overlap itself. The at least one filament need not be limited to linear and helical geometries, however.

In an embodiment, the at least one filament is a plurality of filaments. At least two of the plurality of filaments may overlap. Alternatively, the filaments may not overlap.

In an embodiment, the boundary region comprises inner and outer portions. The inner and outer portions may each have an average refractive index less than that of the majority of the piece of glass. The inner and outer portions may overlap.

Prior to the demonstration of embodiments of the Applicant's present invention, it was generally considered that additional portions would degrade the performance of the amplifying element and was therefore undesirable. The extra processing was thought to introduce undesirable effects such as stress, defect formation, scattering, colour centre formation etc in relation to the glass. Surprisingly, the Applicants have ingeniously found parameters such that it is not necessarily the case. In fact, they found that having additional portions may in some cases dramatically improve the performance of the element.

In an embodiment, the outer portion comprises the at least one filament and inner portion comprises another at least one filament. Each of the other at least one filament has a refractive index less than that of the majority of the piece of glass.

In an embodiment, the other at least one filament may be another plurality of filaments. At least two of the other plurality of filaments may overlap. At least one of the plurality of filaments may overlap with at least one of the other plurality of filaments.

In an embodiment, at least one of the inner and outer portions has at least 5 filaments. At least one of the inner and outer portions may have at least 6 filaments. At least one of the inner and outer portions may have at least 12 filaments. At least one of the inner and outer portions may have at least 20 filaments. Generally, any suitable number of filaments may be used.

In an embodiment, the filaments each have a diameter greater than 1 micrometer. The filaments may each have a diameter less than 40 micrometers. Generally, any suitable filament diameter may be used.

In an embodiment, the inner and/or outer portions may each have a diameter of at least 5 micrometers. The inner and/or outer portions may each have a diameter of at least 20 micrometers. Generally, any suitable inner and/or outer portion diameters may be used.

In an embodiment, the at least one filament and/or the other at least one filament comprise a plurality of filament portions spaced apart along the length of the filament. The filament portions may reflect some wavelength components of the light.

In an embodiment, a grating is disposed along the structure. The grating may be a Bragg grating. The Bragg grating may comprise the plurality of filament portions. The Bragg grating may be at least in part disposed within the interior.

In an embodiment, the average refractive index of any one of the boundaries or filaments is between 0.0001 and 0.01 less than that of the majority of the piece of glass. The average refractive index of any one of the boundaries or filaments may be between 0.001 and 0.005 less than that of the majority of the piece of glass. The average refractive index of any one of the boundaries or filaments may be between 0.001 and 0.0025 less than that of the majority of the piece of glass. The average refractive index of any one of the boundaries or filaments may be around 0.0016 less than that of the majority of the piece of glass. Generally, the refractive index of any one of the boundaries or filaments may be any suitable value.

In an embodiment, the piece of glass is a fluoride glass. The piece of glass may comprise $ZrF_4$, $BaF_2$, $LaF_3$, $AlF_3$, and NaF. The piece of glass may comprise 50-54 mol. % $ZrF_4$, 18-22 mol. % $BaF_2$, 2-6 mol. % $LaF_3$, 1-5 mol. % $AlF_3$, 18-22 mol. % NaF and around 0.01-5 mol. % of centre. Alternatively, the piece of glass may be one of Lead-silicate glass; Germanate glass; Tellurite glass; a glass with a bismuth content of at least 30 mol. % $Bi_2O_3$, a Chalcogenide glass; a Phosphate glass, and a Fluoride-phosphate glass (also referred to as fluorophosphate glass, for example). Generally, any suitable glass may be used.

In an embodiment, the piece of glass comprises indium and fluorine.

In an embodiment, the centre comprises a rare earth ion. The centre may comprise at least one of a Tm ion, a Ho ion, an Er ion, a Pr ion, a Dy ion, a Yb ion and an Nd ion. Generally, but not necessarily, the piece of glass is doped with at least one rare earth ion. Alternatively, the centre may comprise at least one of a quantum dot and a molecule. Any suitable centre may be used.

In an embodiment, the structure is less than 500 micrometers beneath a surface of the piece of glass. The structure may be around 200 micrometers beneath the surface. The structure may, however be any suitable depth beneath the surface.

In an embodiment, the boundary region has a thickness that has been selected by considering the difference of the boundary region's refractive index and the refractive index of a majority of the piece of glass.

In an embodiment, the tubular structure is one of a plurality of tubular structures. The plurality of tubular structures may be relatively arranged to avoid stress fracture of the piece of glass. The spacing between adjacent tubular structures may be at least 300 micrometers. The spacing between adjacent tubular structures may be at least 400 micrometers. The spacing between adjacent tubular structures may be at least 450 micrometers.

According to a second aspect of the invention, there is provided a light amplifier comprising an element defined by the first aspect of the invention.

In an embodiment, the light amplifier comprises a light coupler for coupling the light into the structure. The light amplifier may comprise another light coupler for coupling the other light into the structure. The light amplifier may comprise a source of the other light coupled to the element by the other light coupler. The light coupler and the other light coupler may be the same.

According to a third aspect of the invention, there is provided a laser oscillator comprising an element defined by the first aspect of the invention; and a reflecting portion arranged to resonate the light within the structure.

In an embodiment, the laser oscillator may comprise another light coupler for coupling the other light into the structure. The laser oscillator may comprise a source of the other light coupled to the element by the other light coupler.

According to a fourth aspect of the invention there is provided a method of manufacturing an element for the amplification of a light by stimulated emission of radiation, the method comprising the step of:

translating a focal point of an electromagnetic radiation relative to a piece of glass to form a tubular structure in the glass along which light can be guided, the tubular structure having a boundary region of average refractive index less than that of a majority of the piece of glass, the refractive index of the boundary region being determined, at least in part, by an interaction between the focal point of the electromagnetic radiation and the piece of glass.

Generally but not necessarily, the electromagnetic radiation is a light from a laser.

Surprisingly, the Applicants' have been able to execute this method without significantly degrading the optical performance (e.g. absorption and scattering losses) of the resulting element. The Applicants have been able to write, using optical pulses, waveguiding structures in pieces of glass to create embodiments of an amplifying element. In an embodiment the electromagnetic radiation is temporally modulated. The electromagnetic radiation may comprise femtosecond pulses.

In an embodiment, the piece of glass comprises a plurality of centres that amplify the light when so guided, the amplification being by stimulated emission of radiation when the centres are illuminated by another light.

In an embodiment, the focal point is relatively translated along a series of lines to form filaments which define, at least in part, the boundary region of the structure. The lines may be linear. The lines may be parallel.

In an embodiment, the focal point is relatively translated along at least one helical path to form at least one helical filament which define, at least in part, the boundary region of the structure.

In an embodiment, the step of writing the structure reduces the average refractive index at the focal spot between 0.0001 and 0.01. The reduction in refractive index may be between 0.001 and 0.005. The reduction in refractive index may be between 0.001 and 0.0025 less than that of the majority of the glass. Generally, the refractive index reduction may be any suitable value.

In an embodiment, the glass is a fluoride glass. The glass may comprise $ZrF_4$, $BaF_2$, $LaF_3$, $AlF_3$, and NaF. The glass may be around 52 mol. % $ZrF_4$, 20 mol. % $BaF_2$, 4 mol. % $LaF_3$, 3 mol. % $AlF_3$, 20 mol. % NaF and around 1 mol. % of centre. Alternatively, the glass may be one of Lead-silicate glass; Germanate glass; Tellurite glass; a glass with a bismuth content of at least 30 mol. % Bi2O3, a Chalcogenide glass; a Phosphate glass, and a Fluoride-phosphate glass (also referred to as fluorophosphate glass, for example). Generally, any suitable glass may be used.

In an embodiment, the glass comprises indium and fluorine.

BRIEF DESCRIPTION OF THE FIGURES

Embodiments of the invention will now be described, by way of example only, with reference to the accompanying figures in which:

FIG. 1 shows a schematic diagram of an embodiment of an element for the amplification of a light by stimulated emission of radiation;

FIG. 2 is a schematic diagram of a transverse section of an example of a structure of the element of FIG. 1;

FIG. 3 is a schematic diagram showing a light being launched into the element of FIG. 1;

DETAILED DESCRIPTION OF EMBODIMENTS OF THE INVENTION

Figure 4:
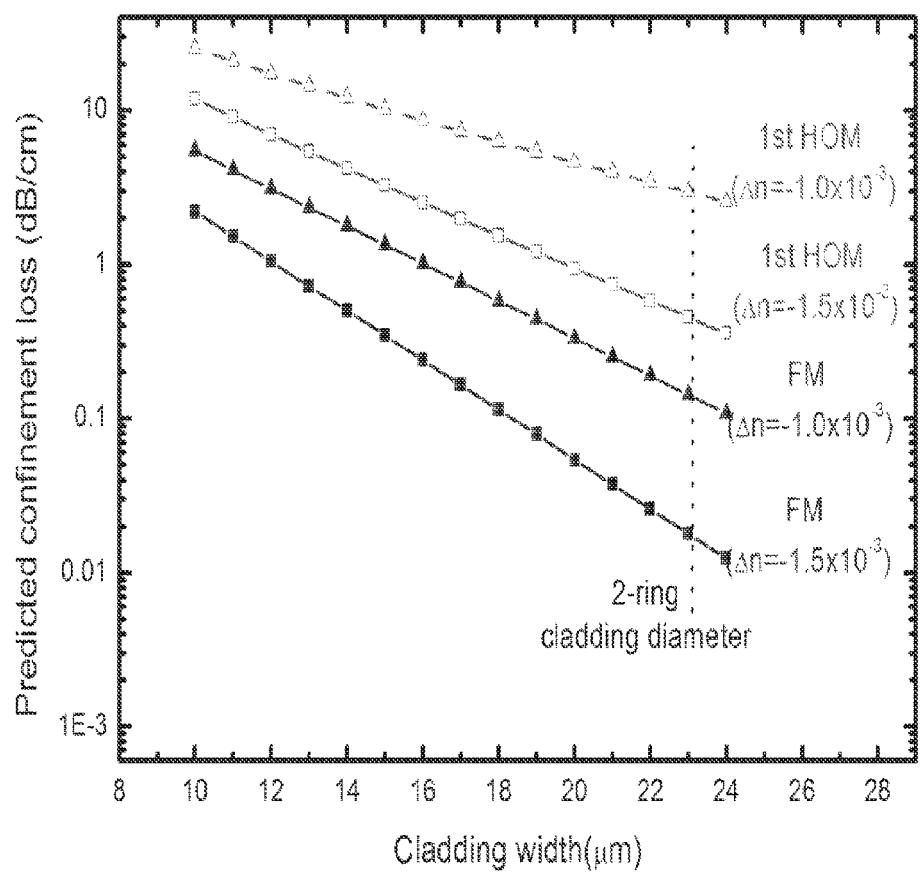
FIG. 4 shows a graph of calculated losses for an example structure.

FIG. 1 shows a schematic diagram of an embodiment of an element for the amplification of a light by stimulated emission of radiation, the element being generally indicated by the numeral 10. The element 10 has an elongated structure 12 formed in a piece of glass 14. The structure has generally a tubular form, located around 200 micrometers beneath a surface 15 of the piece of glass, although it may be generally at any suitable depth.

A light can be guided by the structure 12, such as a light generated along the structure itself by spontaneous or stimulated emission. The structure of this embodiment has a linear form but may generally take on any suitable arbitrary shape such as a squiggle or spiral, for example.

The glass may be a fluoride glass, for example. The glass may comprise, for example, $ZrF_4$, $BaF_2$, $LaF_3$, $AlF_3$, and NaF, such as a ZBLAN glass. One glass composition that the Applicants have found to give acceptable results comprises around 52 mol. % $ZrF_4$, 20 mol. % $BaF_2$, 4 mol. % $LaF_3$, 3 mol. % $AlF_3$, and 20 mol. % NaF. However, the glass may generally be any suitable glass such as one comprising indium and fluorine. Alternatively, the glass may be one of a Lead-silicate glass; a Germanate glass; a Tellurite glass; a glass with a bismuth content of at least 30 mol. % $Bi_2O_3$, a Chalcogenide glass; a Phosphate glass, and a Fluoride-phosphate glass (also referred to as fluorophosphate glass), for example.

FIG. 2 is a schematic diagram of a transverse section of the tubular structure 12. The structure has a boundary region 16 of average refractive index less than that of a majority 18 of the piece of glass 14. The glass 14, in this but not necessarily all embodiments, is uniformly doped with a plurality of centres, such as 20 (shown in the detail), some of which are located in an interior 22 of the tubular structure. In some embodiments, the glass may be doped with of the order of 1% of at least one type of rare earth ion which are the centres. Examples of suitable rare earth ions include Tm ions, Ho ions, Er ions, Pr ions, Dy ions, Yb ions and Nd ions. Alternatively, the centres may be, for example, quantum dots or molecules. Generally, any suitable centre may be used that can amplify light. The centres in the structure 12 amplify the light when so guided by the structure. The amplification is by stimulated emission of radiation which occurs when the centres are illuminated by another light 24. While the doping is generally uniform, in some embodiments, the glass is not uniformly doped. For example, the ions may be disposed only in the vicinity of the structure 12, using an ion implantation system.

The Applicants have demonstrated amplification in element 10 which has Tm ions in a ZBLAN glass of the above particular composition. In this demonstration, the $TmF_3$ doping is around 2.0 mol. %. The rare earth concentration may be different, however. The element 10, which demonstrated amplification, had a structure with an interior 22 diameter of 25 micrometers and of numerical aperture 0.07. The boundary region 16 had a refractive index of 0.0016 less than the unmodified index of the ZBLAN glass of 1.5.

FIG. 3 is a schematic diagram of the other light 24 being launched into the structure. The other light 24, from a fibre pigtailed diode laser 27 for example, is launched into a fibre 30 via a WDM coupler 29 and coupled into the structure 12 by a lens 26 adjacent an end 28 of the structure and an end of the fibre 30. In the case of the Tm:ZBLAN laser demonstrated, the wavelength of the other light is around 790 nanometers.

The interior 22 of the tubular structure has a refractive index greater than that of the boundary region 16. The interior generally, but not necessarily, has the same refractive index as the majority of the glass, that is around 1.5. The interior may, but not necessarily, be more than 1 micrometer across. The interior may, but not necessarily, be less than 40 micrometers across. The boundary region is generally, but not necessarily, greater than 10 micrometers thick, and generally, but not necessarily, less than 40 micrometers thick. The Applicants have found that an interior of between 20 and 30 micrometers across, and a boundary region of between 20 and 30 micrometers thick generally gives acceptable results. A laser using an element having a structure with a boundary thickness of around 25 micrometers has been demonstrated. The boundary region, of this embodiment, has a thickness that has been selected by considering the difference of the boundary region's refractive index and the refractive index of a majority of the glass.

FIG. 4 shows a graph of loss calculation for modelled elements, in which an exact electro-magnetic solution to a circularly symmetric 'W' refractive index profile (like FIG. 2) is presented, for two representative cladding $\Delta n$'s of $-1\times10^{-3}$ and $-1.5\times10^{-3}$ and a core diameter of 30 micrometers. As shown in FIG. 4 the fundamental mode (FM) confinement losses at $\lambda=1.89$ micrometers decrease strongly with increasing $\Delta n$ contrast and boundary region 16 (cladding) width, with the first higher order mode (HOM) having a substantially higher loss (~25×FM loss) for a cladding width of 23 micrometers. This may enable such structures to be 'effectively single mode'. This 23 micrometer cladding width is, for example, the approximate cladding width of the structure in FIG. 25.

Figures 5, 6, 7:
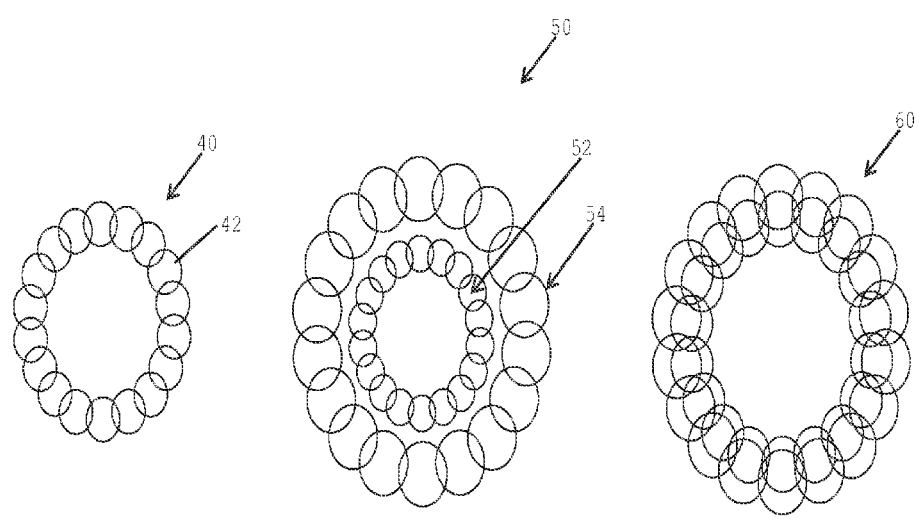
FIGS. 5 to 12 show schematic diagrams of transverse sections of various examples of structures.

FIGS. 5 to 12 show a schematic diagram of transverse sections of various examples of structures generally indicated respectively by the numerals 40, 50, 60, 70, 80, 90, 93 and 96. The boundary region of each of the structures comprise a plurality of filaments extending along the structure (for example, as if out of the sheet presenting the figures). FIG. 5 shows a plurality of overlapping filaments such as 42. Each of the filaments have a refractive index less than that of the majority of the piece of glass, the filaments being arranged to form the tubular structure.

Figures 8, 9, 10:
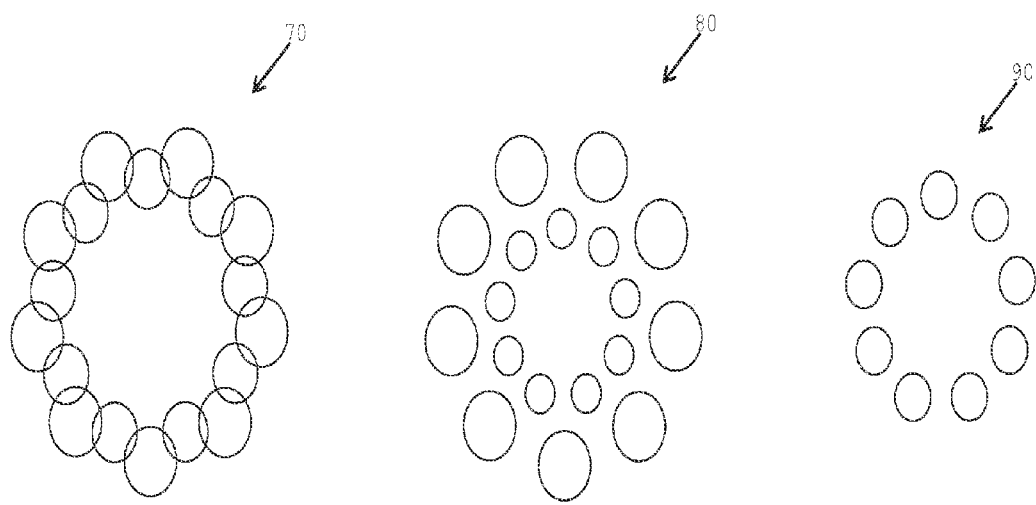

The embodiments shown in FIGS. 6 to 9 have a boundary region with an inner portion such as 52 and an outer portion such as 54. Both the inner and outer portions have an average refractive index less than that of the majority of the piece of glass. As shown in FIGS. 7 and 8, the inner and outer portions may, but also may not, overlap. One laser demonstrated by the applicant had the structure represented by FIG. 12. The inner and outer portions may be described as an inner ring portion and an outer ring portion respectively. In other embodiments, the structure may have more than 2 rings, including but not limited to one of 3, 4, or 5 rings. Embodiments may have greater than 5 rings.

The inner and/or outer portions may each have, for example, a diameter of at least 5 micrometers, and in some embodiments, for example, may each have a diameter of at least 20 micrometers.

The portions 52, 54 may each have various numbers of filaments, such as one of 5, 6, 12 and 20 filaments. Generally any number of filaments may be used, provided that the device is operable. Generally, the filaments may each have a diameter greater than 1 micrometer, and may have a diameter less than 40 micrometers but other values may be possible. At least some of the filaments may comprise a plurality of filament portions spaced apart along the length of the filament, like beads spaced apart along a line.

Figure 11:
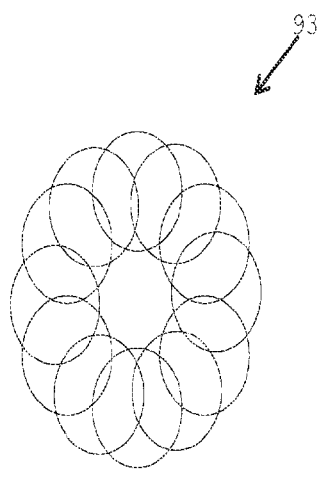
Figure 12:
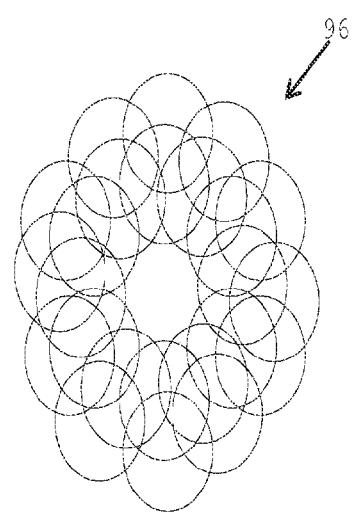

The structures in FIGS. 11-12 can generally be described as a dodecagon, and a double ring dodecagon respectively.

Figure 13:
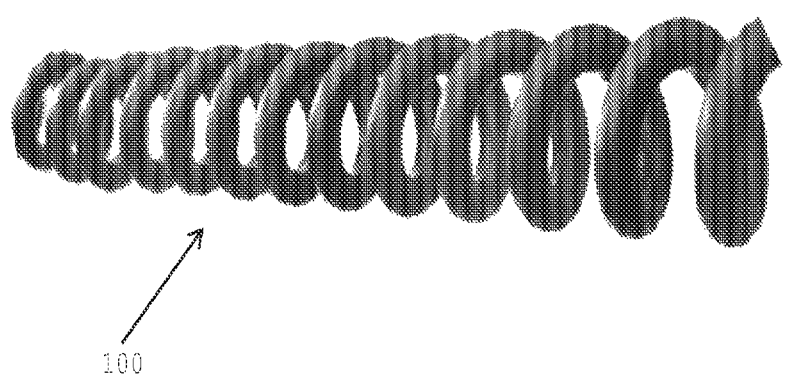
FIG. 13 shows an example of a structure, having a helical filament, in another embodiment of an element.

FIG. 13 shows an example of a structure in another embodiment of an element in which light may be guided along the structure, the structure comprising a filament 100 arranged as a helix. Light is generally guided down the centre of the helix. The pitch of the helix may be such that the filament overlaps itself. The structure may comprise more than one helix, for example a double helix, a triple helix, or generally any number of interwoven or spliced helix.

The plurality of helical filaments may, but not necessarily, overlap. Each filament may have a refractive index less than that of the majority of the piece of glass. Each of the at least one filament may, but not necessarily, have a diameter greater than 1 micrometer, and may have a diameter less than 40 micrometers. The filaments arranged in a helix may each comprises a plurality of filament portions spaced apart along the length of the filament, like beads spaced apart along a line. A Bragg grating may be disposed along the structure. The helix itself may have wavelength selective properties, and be, in effect, a grating.

In various embodiments, the average refractive index of any one of the boundaries or filaments may be between 0.0001 and 0.01 less than that of the majority of the glass, but a refractive index drop of between 0.001 and 0.005 may be easier to achieve using processes such as laser direct writing described further below. The average refractive index of any one of the boundaries or filaments formed by laser direct writing is generally between 0.001 and 0.0025 less than that of the majority of the glass, which may be acceptable.

The device generally indicated by the numeral 23 in FIG. 3 may be operated as a light amplifier. In addition to the other light 24 that excites the centres 20 providing amplification, the light 25 may be launched into the structure 12 via the WDM coupler 29 and optical fibre 30 where it undergoes amplification. The light may then exit from a face 27 of the element 10.

Figure 14:
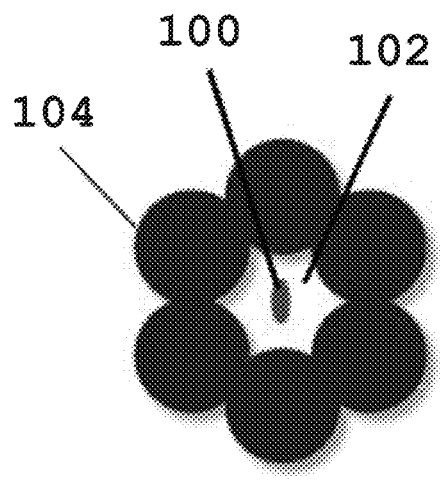
FIGS. 14 to 16 respectively show a schematic diagram of an example Bragg grating, an image of a structure with a Bragg grating written in it, and a measurement of the optical response of the grating of FIG. 16.
Figure 15:
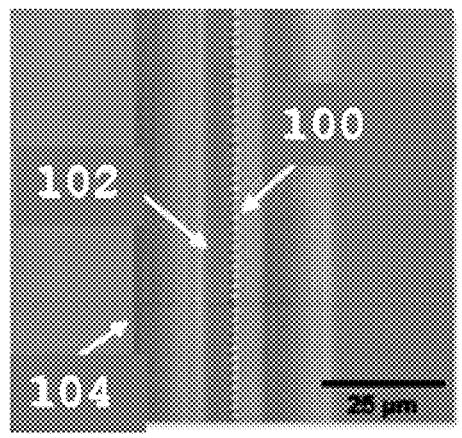
Figure 16:
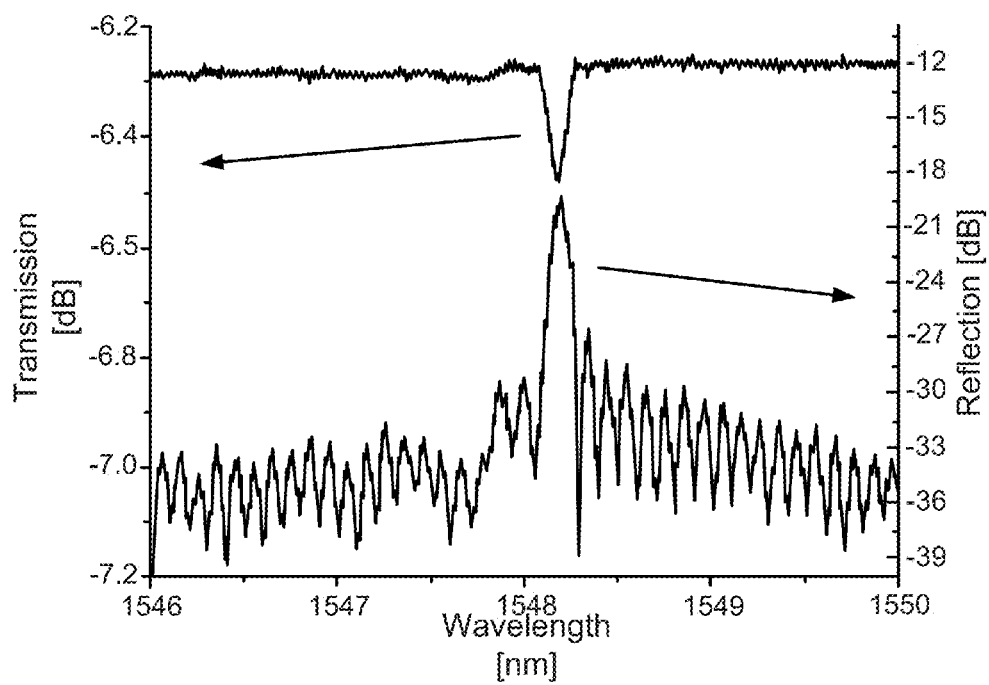

A Bragg grating reflecting light within the gain spectrum of the element 10 may be written along the structure 12 to provide optical feedback. Generally, at least part of the grating is disposed in the interior 22. FIG. 14 shows a schematic diagram of a transverse section of an example grating 100, written point by point in the centre (the waveguide core) 102 of a structure 104 using laser direct writing. FIG. 15 is a differential interference contrast microscopy image of an actual grating ($4^{th}$ order at 1550 nm) written into the structure. The spectral properties of the grating are shown in FIG. 16. The Bragg grating may provide a laser resonator. Alternatively, dielectric mirrors may be deposited on the faces of the element at the ends of the structure to provide resonator mirrors or even external mirrors may abut either end of the structure. The mirrors may be deposited using ion beam sputtering, for example. Generally, any suitable means of providing optical feedback may be employed.

Figure 17:
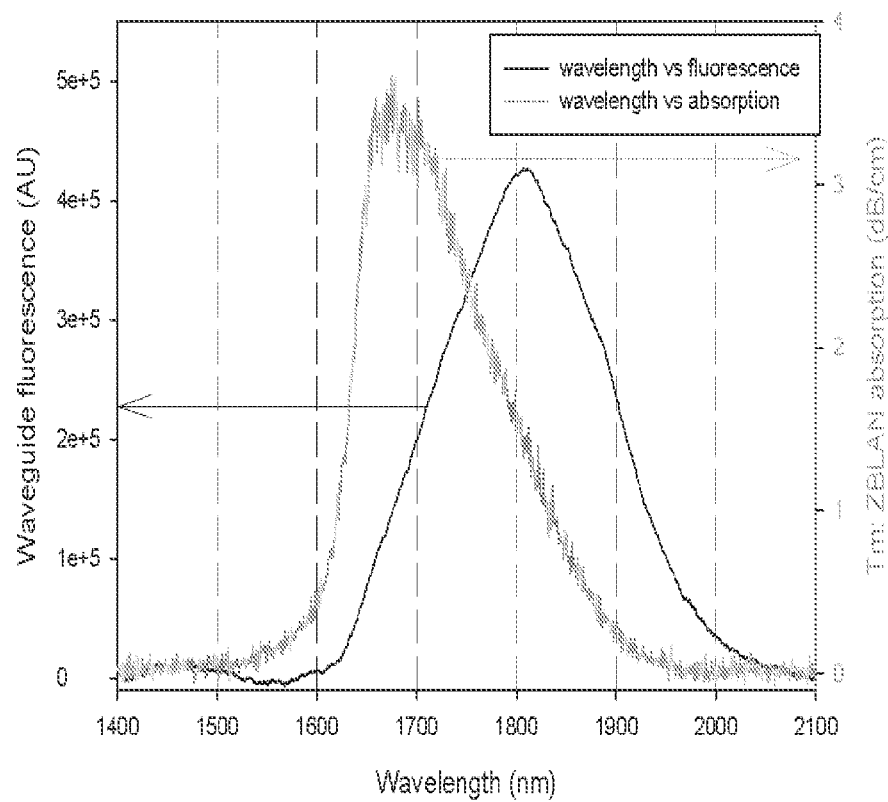
FIG. 17 shows measured absorption and emission spectra of an example element comprising Tm doped ZBLAN glass.
Figure 18:
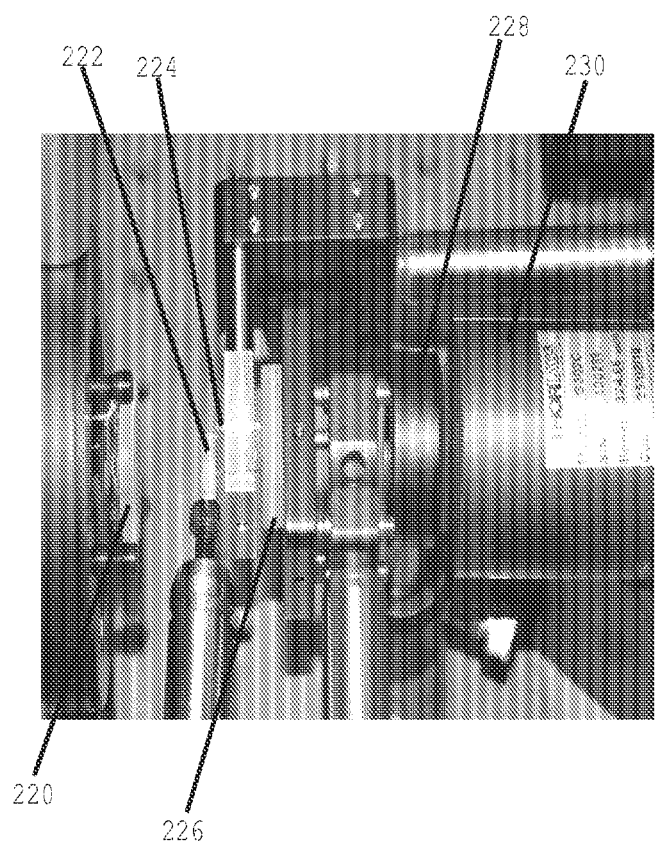
FIG. 18 shows a picture of an embodiment of laser having a Tm doped element.

FIG. 17 shows a measured absorption and emission spectrum of one embodiment of an element. The element comprises Tm doped ZBLAN glass, which was used in the laser of FIG. 18. FIG. 18 is a photograph of a demonstrated embodiment of a laser having a Tm doped element 224. A f=25 mm plano-convex lens 220 focuses a 790 nanometer pump beam travelling from the left. The pump beam is from a diode laser. The numerical aperture of the beam is tailored to match that of the structure, 0.07. A flat dichroic input coupler mirror 222, highly transmitting at 790 nanometers and highly reflecting at 1.9 micrometers, follows the lens 220. The doped glass sheet having the structure is indicated by 224. This is then followed by a flat output coupler mirror 226. A piece of silicon 228 blocks any residual pump and the optical output power is measured by power meter 230.

Figure 19:
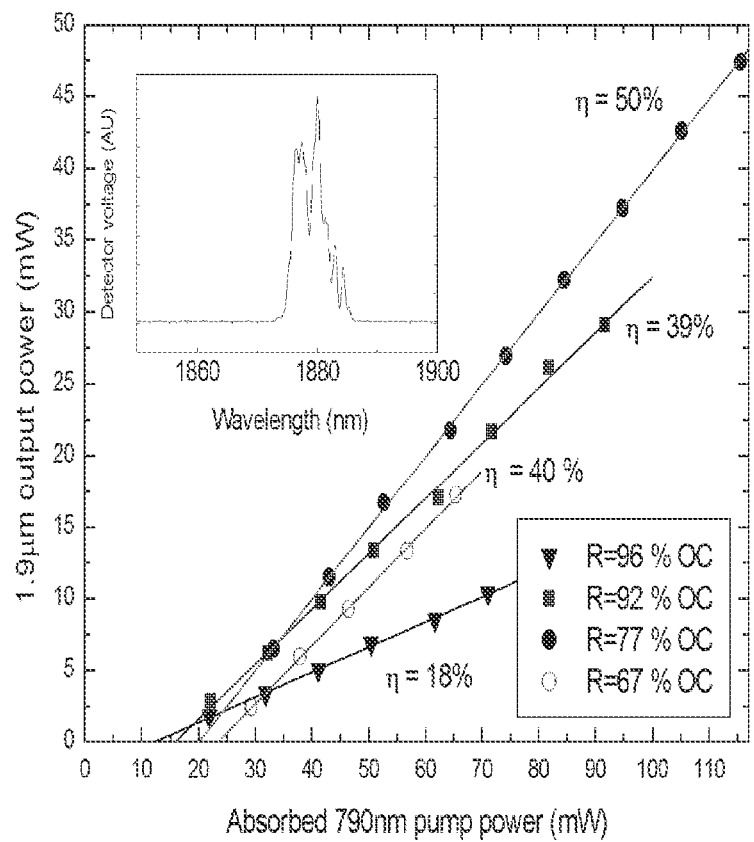
FIG. 19 shows output powers of the laser of FIG. 18 as a function of absorbed pump power; the inset shows the frequency power spectrum of the beam of the laser.

FIG. 19 shows the demonstrated performance of the Tm laser for various resonator output couplers (67% to 96% output coupling) from the ends of the structure. The glass is ZBLAN of the above listed composition having 2.0 mol. % $TmF_3$ doping ($\alpha_{Tm^{3+}:ZBLAN, \lambda=790\ nm}$=5.1 dB/cm). The best slope efficiency was achieved using the 30 μm diameter WG, and a R=77% OC. This gave a 50% internal slope efficiency, 21 mW threshold, and 47 mW of output. The free running laser spectrum was measured to be centred at A=1880 nm with a broad 5 nm bandwidth (FIG. 19 inset).

The structure (or waveguide, WG) was fabricated with a commercial ultrafast Ti:sapphire oscillator (FEMTO-SOURCE XL 500—Femtolasers GmbH, 800 nm centre wavelength, 5.1 MHz repetition rate, 550 nJ pulse energy, 50 fs pulse duration), which was focused into the bulk sample of ZBLAN glass using a 1.25 NA 100X oil immersion objective while the sample was translated using a set of computer controlled XYZ air-bearing translation stages. The combination of high NA focusing and high repetition rate causes cumulative heating followed by heat diffusion. This results in structures of quasi-circular cross section with diameters of up to 50 micrometers. The deposited heat causes a change in the glass structure associated with a relative drop in n of ~1.6× $10^{-3}$. Structure fabrication is described in further detail below.

The ZBLAN glass is doped with a high concentration of $TmF_3$ (2.0 mol %) to allow efficient 2 for 1 cross relaxation into the $Tm^{3+}$ ion excited-state when pumped at 790 nm. The ZBLAN samples were fabricated in a controlled atmosphere glass melting facility using 50 g batch sizes. For this work the WG substrates were diced using a CNC diamond saw into chips or pieces measuring 9 mm long, 8 mm wide and 2 mm high. The top face of each sample was polished to optical grade thereby allowing the ultrafast direct-write laser to be focussed through this surface. Each chip was inscribed by the fs laser with up to 42 WGs at a depth of 150 μm. After WG writing, the end faces were polished back by ~250 μm to reveal the WG ends.

To estimate the WG propagation loss a Findlay-Clay analysis on the lasing data plotted in FIG. 19 gave an estimated loss of 0.22±0.06 dB/cm. This value should be considered an upper limit since it includes ground state absorption losses due to the 3-level nature of the 1.9 μm transition in thulium.

The beam quality was measured by determining the focussed beam widths on an array sensor (Spiricon Pyrocam), and was measured to be $M^2=1.7\pm0.2$. A Gaussian beam profile in the far-field was observed which would be expected for the fundamental mode.

Figure 20:
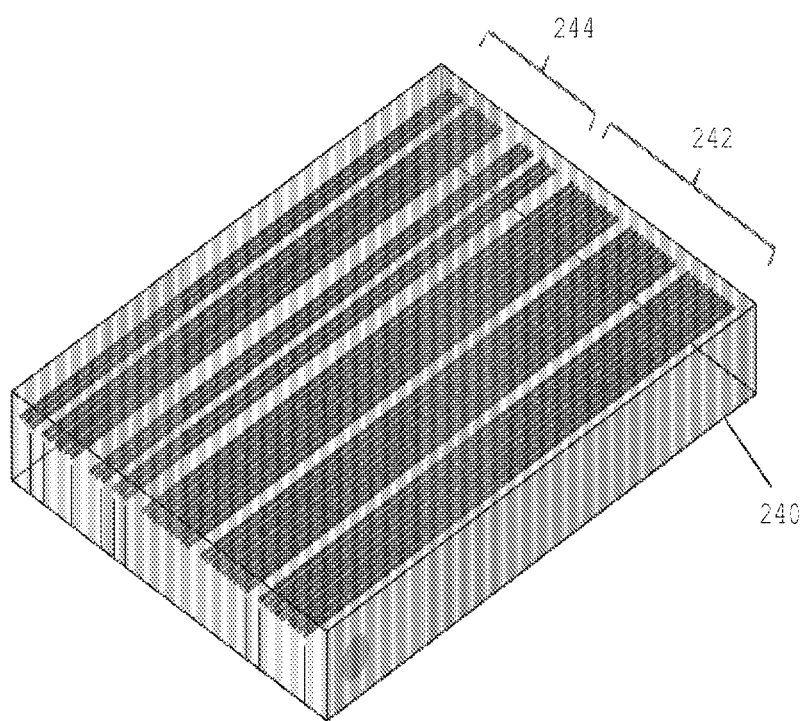
FIG. 20 shows a schematic of an example of a piece of glass having multiple structures written into it.

FIG. 20 shows a schematic of an example of a piece of ZBLAN glass 240 uniformly doped with rare earth ions and having multiple linear wave guiding structures written into it. This is a rendering of a CAD file that can be read by a machine that writes the structures in a piece of glass. The structures are at least 150 micrometers below the top surface of the piece of glass. The spacing between the structures is generally 150 micrometers. The structures indicated by numeral 242 have filaments located at the corners of a hexagon. The structures indicated by the numeral 244 have filaments located at the corners of a dodecagon.

Figure 21:
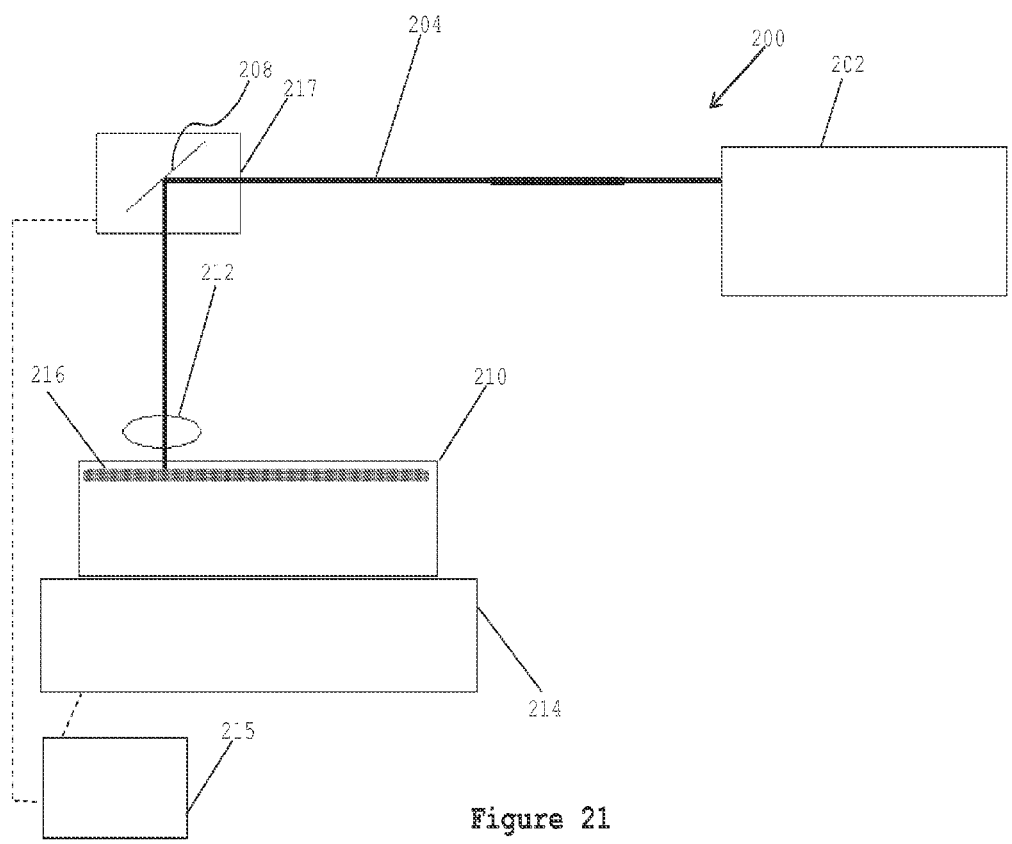
FIG. 21 shows an embodiment of an apparatus for manufacturing some embodiments of an element.
Figure 22:
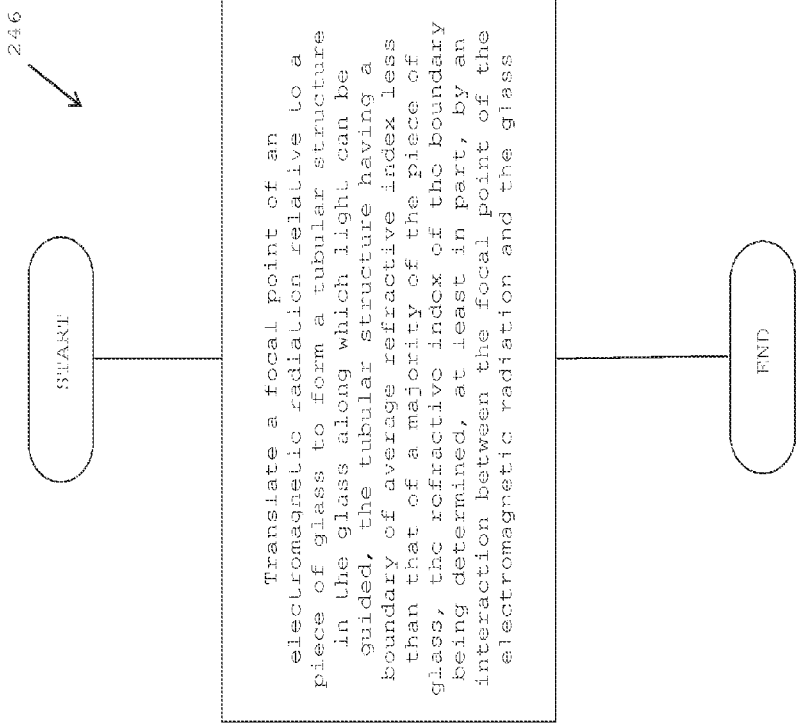
FIG. 22 shows a flow diagram of one embodiment of a method of manufacturing an element such as that of FIG. 21.

An apparatus for manufacturing some embodiments of an element is shown in FIG. 21 and is generally indicated by numeral 200. FIG. 22 shows a flow diagram 246 of one embodiment of a method of manufacturing an element that may be performed using the apparatus of FIG. 22. Electromagnetic radiation in the form of a light 204 from a femtosecond laser 202 (having a 800 nm centre wavelength, 5.1 MHz repetition rate, 50 fs pulses, 550 nj pulse energy) is turned by a mirror 208 and then focused to a focal spot in a piece of glass 210, such as ZBLAN or another fluoride glass, by an objective lens 212. The objective lens 212 is a 100× 1.25 NA oil immersion objective. The focal point is translated relative to the piece of glass 210 to write a structure 216 in the glass. The structure may be a tubular structure along which light can be guided. In this embodiment, this is achieved by placing the piece of glass 210 on a 3 axis air-bearing precision CNC stage 214 (Aerotech airbearing) moving the glass. Generally, any suitable computer controlled stage may be used. The stage 214 is controlled by a controller 215 in communication with the stage via a wired or wireless connection, the connection being shown in dashing. The stage 214 is moved in accordance with data in a file, such as but not limited to a CAD file, read by the controller 215. In one embodiment, the controller comprises a personal computer running suitable software including but not limited to Lab View, Wonder Ware, and Labtech Notebook. The controller may have an interface expansion card to interface between the software and the stage 214. Alternatively, the controller may communicate with the stage over a serial or other port. The controller may generally comprise any suitable combination of custom hardware and software. The controller may comprise one or more of an embedded system, microcontrollers, digital signal processes, memory, a user interface, and other components connected over a bus. The controller may be an industrial PC. In alternative embodiments the focal spot is scanned. The turning mirror may be coupled to a tilting actuator 217 which is in communication with and receives instructions from the controller 215 which causes the actuator to tilt the mirror in accordance with the CAD representation. The focal point may be translated at a rate of between 100 mm/min and 2000 mm/min, for example, to write each of the filaments or other structural forms. The tubular structure formed may have a boundary region of average refractive index less than that of a majority of the piece of glass, the reduction of refractive index determined at least in part by an interaction between the focal point of the electromagnetic radiation and the glass.

Alternatively, the glass may be one of a Lead-silicate glass; a Germanate glass; a Tellurite glass; a glass with a bismuth content of at least 30 mol. % $Bi_2O_3$, a Chalcogenide glass; a Phosphate glass, and a Fluoride-phosphate glass (also referred to as fluorophosphate glass, for example. Generally any suitable glass may be used.

The focal point can be relatively translated along a series of straight parallel lines to write structures such as those in FIGS. 5-12 or along a helix to write structures such as that in FIG. 13. Generally, any suitable filament geometry may be written.

An interior of the structure may have the optical properties of the majority of the glass because modification of the glass is strongly confined to the vicinity of the focal spot; absorption of the light increases faster than linearly (i.e. nonlinearly) with light intensity. This may result in relatively low absorption and scattering of the light from the interior of the structure.

Figure 23:
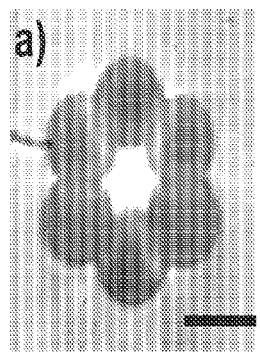
FIGS. 23 to 25 show microscope images of end views of three example structures.
Figure 24:
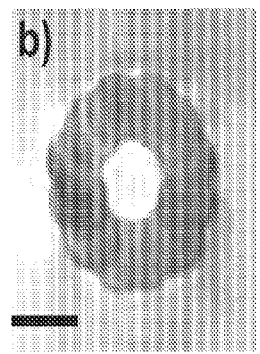
Figure 25:
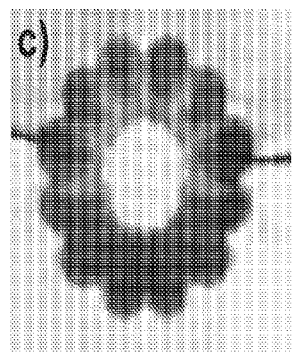

Microscope images of the end views of three WG geometries written in ZBLAN glass with the apparatus of FIG. 21 are shown in FIGS. 23 to 25. These structures approximate a "W" waveguide geometry, which can support guided electromagnetic modes at particular wavelengths provided that the depressed region of the cladding is sufficiently wide for the given index contrast. Structures with increasing complexity (FIGS. 23 to 25) were written with the aim of achieving a more uniform reduced refractive index in the cladding, and increased cladding width. Note that while all of these structures guided light, only the structure in FIG. 25 achieved lasing at a wavelength of 2 micrometers (this is consistent with the numerical modelling predictions in FIG. 4).

The WG in FIG. 23 is composed of 6 cylinders arranged in a hexagon around the unexposed core, and written using 60 nJ pulses; FIG. 24 is composed of 12 overlapped cylinders (65 nJ); while FIG. 25 is 24 cylinders formed from 2 partially overlapping rings of 12 cylinders each (50 nJ pulses) with a core diameter of ~30 μm. The depressed claddings for all WGs were written sequentially from the bottom to the top to avoid focusing through previously modified glass while the sample was translated at 1000 mm/min. The stress fracture apparent in FIGS. 23 and 25 does not appear to affect the guiding behaviour. The fracture is attributed to the high density of the devices, which were separated by just 150 μm.

Figure 26:
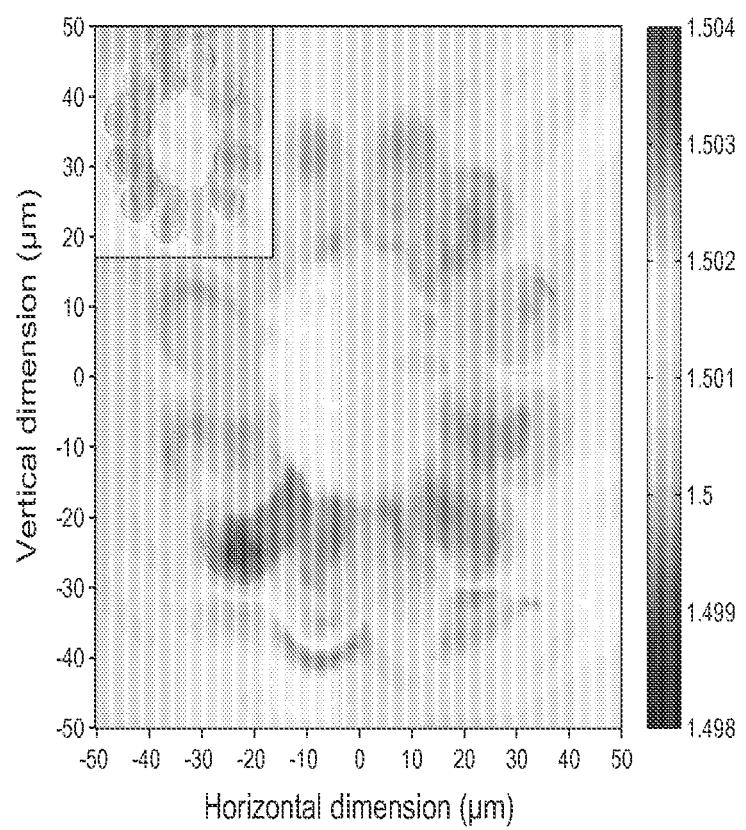
FIG. 26 shows the measured refractive index profile of the structure of FIG. 25.

To explore the effect of writing depressed cylinders in close proximity to each other (e.g. two overlapping rings), a high resolution refractive index profile of the structure of a two ring WG structure was taken at 637 nm with a refractive index profilometer (RINCK Elektronik). The main image in FIG. 26 shows the absolute refractive index profile of a 24-cylinder WG structure fabricated at 50 nJ, with the inset showing an optical microscope image of the same WG. The n data reveals a net Δn change in the ring structures of $\sim-1\times10^{-3}$ to $-1.5\times10^{-3}$. Localized regions with slightly increased n were also observed, possibly due to stress.

First Further Example

Figure 27:
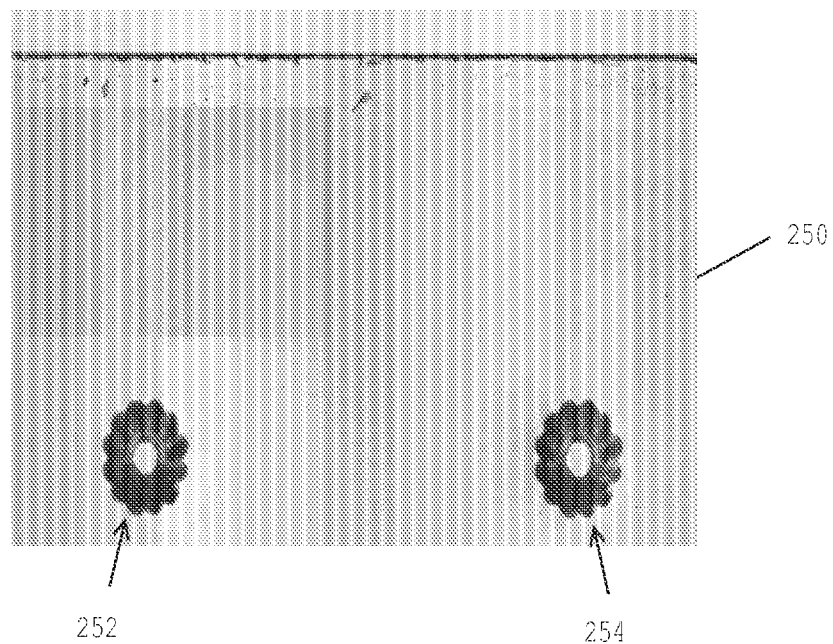
FIG. 27 shows an end view of an embodiment of a piece of glass in which two structures are formed.
Figure 28:
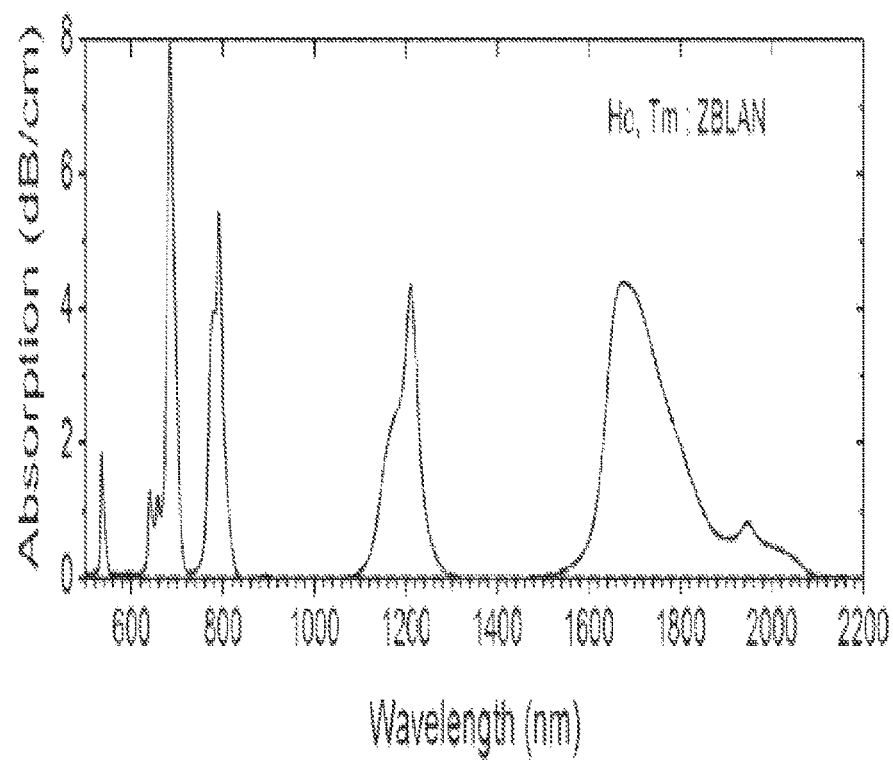
FIG. 28 shows an absorption spectrum of a piece of Ho and Tm doped glass.

A 50 g block of ZBLAN glass doped with 0.22 mol % $HoF_3$ and 1.96 mol % $TmF_3$ was fabricated and diced into rectangular sections or pieces (9 mm long, 8 mm wide and 2.7 mm high) where the top, bottom and end-faces were polished to an optical grade. The WGs (waveguides) were written into the doped glass with ultrafast light pulses. A microscope image of the polished end face with 2 WGs is depicted in FIG. 27. The distance between the centres of the waveguides is 450 micrometers. Each WG is defined by 24 partially overlapping direct-written longitudinal filaments to define a 'W' refractive index profile, with a measured cladding Δn of −0.0016±0.0003, compared to the bulk glass and the unmodified interior (core), and a boundary region (cladding) width of ~32 μm. By increasing the spacing between adjacent WGs from 150 μm to 450 μm, multiple WGs have been produced in a single piece of glass with no evidence of stress fractures, which may be a problem in the case of closely spaced waveguides. A waveguide spacing of at least 300 micrometers may avoid stress fracture. The fabricated $Ho^{3+}$, $Tm^{3+}$ WG device contained 15 depressed cladding WGs with WG core diameters ranging from 15 to 45 μm. The measured absorption of a polished Ho, Tm:ZBLAN sample is shown in FIG. 28 (CARY 5000 spectrophotometer).

Figure 29:
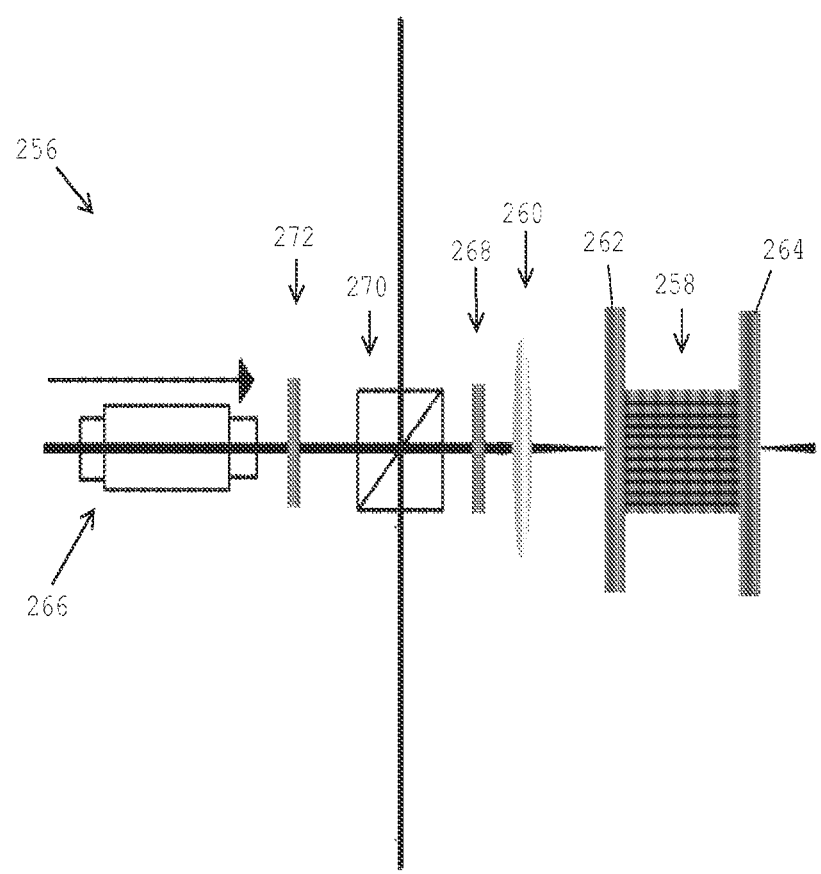
FIG. 29 shows a schematic diagram of another embodiment of a laser having a Ho and Tm doped element.

FIG. 29 details an example laser apparatus 256 having a piece of the Ho and TM doped ZBLAN glass. A CW Ti:sapphire laser tuned to 790 nm (α=5.4 dB/cm) was focussed into the uncoated WG slab 258 using a f=50 mm lens 260 giving a spot size of ~29 μm. The 24 μm diameter WG gave the highest slope efficiency for this pump focussing condition and it was thus used throughout this embodiment. Flat dielectric coated cavity mirrors 262, 264 were butted up to either end of the slab, where the input coupler 262 was highly transmitting at 790 nm, and highly reflecting from 1.8 to 2.1 μm. Several output couplers 264 (OCs) were trialled, with only the R=77% OC designed to double-pass the 790 nm pump light. To isolate the Ti:sapphire laser from feedback an optical isolator 266 was used (22 dB of isolation). To further reduce feedback to the pump laser, and to enable an estimate of the unabsorbed pump light, a λ/4 plate 268 converted the incident light on the WG to circular polarization and the unabsorbed counter propagating pump-beam was in-turn converted to a vertical linear polarization and directed out of the beam path via a polarizer 270 onto a power meter. The apparatus 256 also has a λ/2 plate 272.

Figure 30:
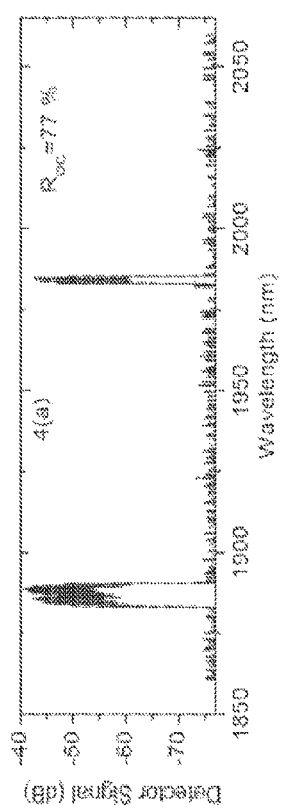
FIGS. 30 and 31 show example frequency power spectra of the beam from laser of FIG. 29 for different laser cavity configurations.

The spectral (FIGS. 30 and 31) and power (FIG. 32) characteristics of the Ho, Tm:ZBLAN laser were found to be dependent on the OC used. This is due to gain competition between the shared excited state populations of the $Tm^{3+}$ $^3H_4$ and $Ho^{3+}$ $^5I_7$ states. When the R=77% OC was used, the laser operated simultaneously at λ=1880 nm and 1978 nm as shown in FIG. 30 (spectrum recorded with a Yokogawa AQ6375 OSA). For this R=77% OC, the absorbed-power slope efficiency was up to 29% (where the absorbed power was calculated from measuring the depleted pump power). The high laser threshold of 150 mW (FIG. 32) was consistent with the additional intra-cavity losses due to Ho ion absorption at these wavelengths (see FIG. 28).

Figure 31:
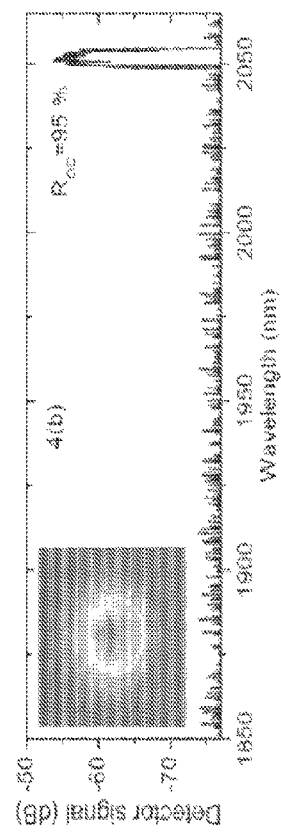
Figure 32:
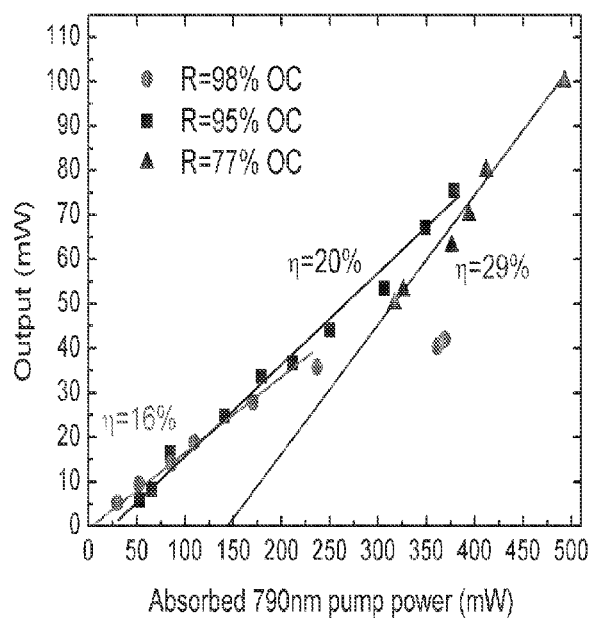
FIG. 32 shows the output power of the laser of FIG. 29 as a function of absorbed pump power for different laser cavity configurations.

When the 95% and 98% OCs were used, the laser was observed to operate on a single line at the peak of the $Ho^{3+}$ fluorescence emission near 2052 nm (see FIG. 31). The absorbed-power slope efficiencies for these OCs are shown in FIG. 32. It can be seen that the 95% OC provided the best performance with 20% slope efficiency and 20 mW threshold (incident slope efficiency was 12%). The 98% OC slope efficiency was lower at 16% until an absorbed power of 250 mW was reached; at pump power >250 mW the efficiency is reduced which is likely due to increased losses from a combination of energy transfer upconversion and excited-state absorption.

The beam quality of the laser was measured using a Spiricon Pyrocam camera. A single transverse mode was observed, with a measured $M^2$=1.6. A near-field image of the un-collimated beam is shown in the inset to FIG. 31.

Second Further Example

Figure 33:
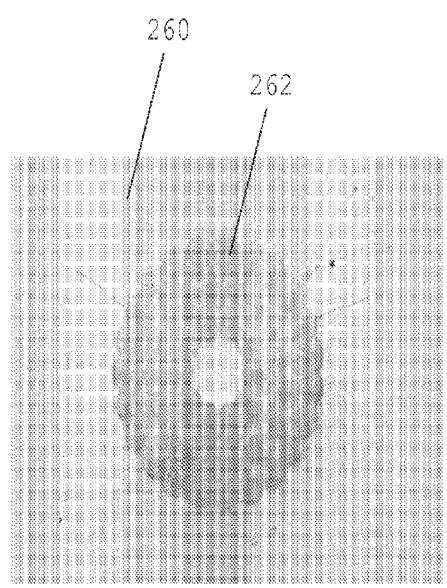
FIG. 33 shows an image of an example structure in an embodiment of an element.

FIG. 33 shows an end-on view of an example structure 262 in an embodiment of an element 260, taken using a microscope. The element 260 is configured for mid-infrared operation near 3 micrometers. The element comprises a piece of 2 mol % Ho doped ZBLAN glass that is substantially transparent at mid-infrared wavelengths (extending up to 5 micrometers). The element has a structure configured for guiding light at a wavelength near 3 micrometers. The structure was written into the glass using the apparatus of FIG. 21.

The element is expected to provide gain at near 3 micrometers when pumped at 1150 nm. The element may be incorporated into an apparatus similar to that of FIG. 29, for example, suitably adapted for the pump and laser (or amplification) wavelengths.

The structure 262 has around 50 filaments arranged in 3 concentric rings, a 27 micrometer diameter interior (core) and a boundary region (cladding) width of 42.5 micrometers. It will be appreciated that numerical modeling indicates that a relatively thick boundary region width is required to provide low loss at this relatively long wavelength, predicted to be <0.02 dB/cm. This relatively thick boundary region has been achieved, in this but not necessarily in all embodiments, by having three, rather than one or two, rings of filaments.

Some embodiments may have some of the following advantageous:

A low threshold mid-infrared laser with relatively greater efficiency may be realised;

Direct written waveguides having intrinsic pump and laser mode overlap may reduce laser threshold, especially for 3-level transitions;

Diffraction limited beam quality may be achieved;

Waveguides may be rapidly and cheaply fabricated into minimally prepared doped glasses;

Multiple waveguides may be formed in a piece of glass without stress fracture;

Compact sources of infrared laser radiation may be realised; and

The rectangular planar elements of some embodiments may be suited for use with integrated circuits, electronic circuit boards, photonic chip devices and other structures that have an inherent planar geometry.

Lasers and amplifiers operating at mid-infrared wavelengths may be possible.

It will be understood to persons skilled in the art of the invention that many modifications may be made without departing from the spirit and scope of the invention. For example, the tubular structure may have a transverse section having any suitable geometry, such as triangular, square, rectangle, hexagonal, or any other suitable shape as appropriate for the circumstances. The piece of glass may be rounded, spherical, or generally any suitable geometry.

It is to be understood that, if any prior art is referred to herein, such reference does not constitute an admission that the prior art forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An element for the amplification of light by stimulated emission of radiation, the element comprising:
   a piece of glass comprising at least one filament forming a boundary region that defines an interior of a tubular structure within the piece of glass along which the light in use is guided, the boundary region having an average refractive index that is less than that of the interior of the tubular structure and less than that of a majority of the piece of glass,
   the piece of glass further comprising a plurality of centres located within the piece of glass and that amplifies the light when so guided, the amplification being by stimulated emission of radiation when the plurality of centres is illuminated by a suitable other light.

2. The element defined by claim 1 wherein the at least one filament is in the form of a line.

3. The element defined by claim 1 wherein at least one filament is helical.

4. The element defined by claim 1 wherein the at least one filament is a plurality of filaments.

5. The element defined by claim 4 wherein at least two of the plurality of filaments overlap.

6. The element defined by claim 1 wherein the boundary region comprises inner and outer portions.

7. The element defined by claim 6 wherein the inner and outer portions overlap.

8. The element defined by claim 6 wherein the outer portion comprises a plurality of filaments, the inner portion comprises another plurality of filaments, and at least one of the plurality of filaments overlaps with at least one of the other plurality of filaments.

9. The element defined by claim 1 wherein the piece of glass is a fluoride glass.

10. The element defined by claim 9 wherein the piece of glass comprises ZrF4, BaF2, LaF3, AlF3, and NaF.

11. The element defined by claim 1 wherein the piece of glass comprises indium and fluorine.

12. The element defined by claim 1 wherein the centre comprises a rare earth ion.

13. The element defined by claim 1 wherein the boundary region is greater than 10 micrometers thick.

14. The element defined by claim 1 wherein the boundary region is less than 40 micrometers thick.

15. The element defined by claim 1 wherein the boundary region is between 20 and 30 micrometers thick.

16. The element defined by claim 1 wherein the boundary region is around 25 micrometers thick.

17. The element defined by claim 1 wherein the average refractive index of any one of the boundaries or filaments is between 0.0001 and 0.01 less than that of the majority of the piece of glass.

18. The element defined by claim 1 wherein the average refractive index of any one of the boundaries or filaments may be between 0.001 and 0.005 less than that of the majority of the piece of glass.

19. The element defined by claim 1 wherein the average refractive index of any one of the boundaries or filaments may be between 0.001 and 0.0025 less than that of the majority of the piece of glass.

20. The element defined by claim 1 wherein the average refractive index of any one of the boundaries or filaments may be around 0.0016 less than that of the majority of the piece of glass.

21. The element defined by claim 1 wherein the boundary region has a thickness that has been selected by considering the difference of the boundary region's refractive index and the refractive index of a majority of the piece of glass.

22. A light amplifier comprising the element defined by claim 1.

23. A laser oscillator comprising:
   the element defined by claim 1; and
   a reflecting portion arranged to resonate the light within the structure.

24. A method of manufacturing an element for the amplification of a light by stimulated emission of radiation, the method comprising the step of:
   translating a focal point of an electromagnetic radiation to form at least one filament within the piece of glass that forms a boundary region, the boundary region defining an interior of a tubular structure within the piece of glass along which light can be guided, the boundary region having an average refractive index less than that of the interior of the tubular structure and less than that of a majority of the piece of glass, the refractive index of the boundary region being determined, at least in part, by an interaction between the focal point of the electromagnetic radiation and the piece of glass.

25. The method defined by claim 24 wherein the focal point is relatively translated along a series of lines to form a plurality of filaments which defines the boundary region of the structure.

26. The method defined by claim 24 wherein the focal point is relatively translated along at least one helical path to form at least one helical filament which defines the boundary region of the tubular structure.

* * * * *